United States Patent Office 3,686,249
Patented Aug. 22, 1972

3,686,249
METHOD OF PREPARING ALUMINUM COMPLEXES OF POLYHYDROXY COMPOUNDS
Ludwig A. Hartmann, Wilmington, Del., assignor to Atlas Chemical Industries, Inc., Wilmington, Del.
No Drawing. Filed Apr. 24, 1970, Ser. No. 31,749
Int. Cl. C07f 5/06
U.S. Cl. 260—448 AD     9 Claims

ABSTRACT OF THE DISCLOSURE

Aluminum complexes of polyhydroxy compounds are prepared by reacting an aluminum alkoxide with a polyhydroxy compound such as sorbitol in the presence of a minimum amount of water followed by drying and stripping under less than about 1 mm. Hg.

---

This invention relates to the preparation of aluminum complexes of polyhydroxy compounds. These complexes are useful as antacids and may be used in the same manner as aluminum hydroxide. They are also useful as catalysts in organic reactions where a basic catalyst is used such as in isomerizations, for example, the isomerization of glucose and fructose.

Aluminum complexes of polyhydroxy compounds are produced by reacting an aluminum alkoxide and a polyhydroxy compound. However, the prior art methods of producing complexes of this general type (see, for example, Davison U.S. Patent 3,198,332 and Holbert U.S. Patent 3,352,895) utilize conditions which do not favor complete reaction of the alkoxide groups introduced into the complex by the aluminum alkoxide. The presence of residual or partially reacted alkoxide in the complex results in the liberation of alcohol when placed in an acidic environment which can be very undesirable. For example, if aluminum methoxide or aluminum isopropoxide were used in the preparation of the complexes according to the prior art, partial reaction of the alkoxide with the aqueous polyhydroxy compound would result in residual methoxy or isopropoxy groups on the aluminum atoms. Methanol or isopropyl alcohol would then be released upon ingestion should the complexes be used as antacids.

However, the method of this invention produces virtually completely reacted alkoxide, so that the complex does not release alcohol in an acidic environment. This is accomplished by using a larger quantity of water than was used in prior art methods which promotes the complete reaction of the alkoxide and by the use of a final high vacuum step which strips alcohol from any unreacted alkoxide which is present.

My related applications of the same filling date titled "Magnesium-Aluminum Complexes of Polyhydroxy Compounds and Their Preparation" and "Magnesium Complexes of Polyhydroxy Compounds and Their Preparation," Ser. Nos. 31,750 and 31,751, respectively, may be referred to for additional information in this area.

STARTING MATERIALS

Aluminum alkoxides are well known and may be prepared, for example, by reacting aluminum with a monohydric alcohol. The aluminum alkoxide preferably has the formula Al(OR)$_3$, where R is alkyl up to C$_4$. Aluminum isopropoxide is preferred as it is readily available. Mixtures of aluminum alkoxides may also be used.

The polyhydroxy compound is an organic compound having at least two hydroxyl groups. The preferred polyhydroxy compounds, which are more readily available, have from 3 to 6 carbon atoms and are linear or branched, preferably linear, and preferably have 2 to 6 hydroxyl groups which may be in a vicinal or in a 1,3-relationship to each other. Suitable polyhydroxy compounds include propylene glycol, 1,2-, 1,3-, and 2,3-butylene glycols, 1,2-, 1,3-, 2,3-, and 2,4-pentylene glycols, 1,2-, 1,3-, 2,3-, and 2,4-hexylene glycols, glycerol butanetriols, pentanetriols, hexanetriols, erythritol, pentanetetrols, hexanetetrols, xylitol, hexanepentols, sorbitol, mannitol, and dulcitol; sorbitol is preferred because it is readily available. Also contemplated are mixtures of polyhydroxy compounds and polymers of polyhydroxy compounds such as hydroxyl bearing polyethers, e.g., diglycerol, polyglycerols, etc.

THE COMPLEX

The complexes preferably have a ratio of about 0.1 to about 0.7 (preferably about 0.1 to about 0.4) gram atoms of aluminum to each hydroxyl group of the polyhydroxy compound. Ratios outside this range may result in large amounts of unreacted ingredients, polymeric structures, or the dilution of the aluminum to a level where the complex becomes less effective. The exact structure of the complex produced is not known. However, it is believed that the product is a mixture of compounds of the following type:

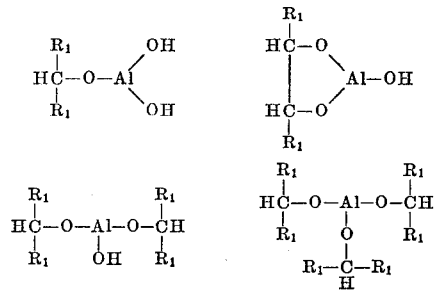

where each R$_1$ is appropriately selected from hydrogen, alkyl, or hydroxyl-substituted alkyl so that the above compounds result from the reaction of a polyhydroxy compound.

PREPARATION OF THE COMPLEX

The aluminum alkoxide and the polyhydroxy compounds are reacted in the presence of water. This amount of water, in moles per gram atom of aluminum, is equal to about 6 to about 18 (preferably about 12) times the number of gram atoms of aluminum charged divided by the number of hydroxyl equivalents of polyhydroxy compound charged. This amount of water, in moles per gram atom of aluminum, is preferably about 6 to about 12 times the number of gram atoms of aluminum chargred divided by the number of hydroxyl equivalents of polyhydroxy compound charged when the ratio of gram atoms of aluminum to each hydroxyl group of the polyhydroxy compound is about 0.1 to about 0.4 and is about 12 to about 18 times the number of gram atoms of aluminum charged divided by the number of hydroxyl equivalents of polyhydroxy compound charged when the ratio of gram atoms of aluminum to each hydroxyl group of the polyhydroxy compound is about 0.4 to about 0.7; this is preferred because the hydroxyl groups on the polyhydroxy compound tend to reduce the need for water. The temperature of the reaction is not critical, but about 70° F. is preferred.

As the reaction proceeds and the reaction mixture thickens, enough water-miscible solvent may be added to dilute the mixture so that it may be easily stirred. Dioxane, methyl Cellosolve, alcohols such as methanol, ethanol, propanol, or isopropanol, etc., are examples of suitable solvents; alcohols are preferred as they are inexpensive, easily distilled, and the polyhydroxy compounds are very soluble in them.

After the alkoxide and the polyhydroxy compound have reacted to form the complex, the complex is dried. This is preferably done by vacuum treating under slightly reduced pressure at about 55 to about 90° C.

While the drying step removes the excess alcohol, it does not remove the residual alcohol which is attached to the complex in the form of unreacted alkoxide. This alcohol is stripped from the complex by vacuum treating under less than about 1 mm. of mercury and at a temperature of 55° C. to about 90° C. preferably with thorough agitation. (Below 55° C. too much time is required to make the process practical and above 90° C. the complex tends to decompose.)

EXAMPLES

The following examples further illustrate this invention, Example I being the preferred example:

Example I

A one-liter flask provided with a stirrer and a thermometer was charged with 72.9 grams of sorbitol and 77.1 grams of water and was vigorously stirred and heated to about 35° C. Then 163.2 grams of finely-ground aluminum isopropoxide was added in portions over a 40-minute period during which the temperature rose to 52° C. A thin suspension was formed. After 100 grams of aluminum isopropoxide had been added, the reaction mixture became thicker. Then 180 ml. of isopropyl alcohol was added as a diluent in stages and the reaction was continued at 70° C. for an hour and a half. The product was dried at 50 to 70° C. and 200 mm. for 4 hours and 70 to 80° C. and 20 to 30 mm. for 10 hours. Stripping was then carried out at 70 to 80° C. and less than 1 mm. for 16 hours. The yield was 114.3 grams and analysis showed 19.2% aluminum, 36.27% ash, 0.09% alcohol, and 4.74% free sorbitol. The approximate molar ratio of aluminum to sorbitol to inorganic hydroxyl groups was 2:1:2.9 in the complex (those hydroxy groups attached to the aluminum and titratable with acid are referred to herein as "inorganic").

Example II

Using the same procedure that was used in Example I, a flask was charged with 72.9 grams sorbitol and 136.7 grams water. The solution was stirred vigorously and heated. Then 244.8 grams of finely-ground aluminum isopropoxide was added in portions at 45 to 65° C. As the reaction proceeded, the mixture became thicker and the temperature reached 70° C. Then 335 ml. isopropyl alcohol was added in stages as a diluent. The reaction was continued at 70° C. for 3½ hours. Drying was conducted at 50 to 70° C. and 200 mm. for 4 hours, 70 to 80° C. and 20 mm. for 8 hours. The product was then stripped of combined alcohol at 70 to 80° C. and less than 1 mm. for 48 hours. The yield was 138.4 grams and analysis showed 21.4% aluminum, 43.05% ash, 0.27% alcohol, and 0.34% free sorbitol. Approximate molar ratio of aluminum to sorbitol to inorganic hydroxy groups was 3:1:4.9.

Example III

Following the same procedure used in Example I, a flask was charged with 72.9 grams sorbitol and 16.7 grams of water. The mixture was stirred vigorously and heated to 60–65° C. Then 81.6 grams finely-ground aluminum isopropoxide was added in portions. The mixture became thicker and reached 70° C. after 22 minutes. The reaction was continued at 70° C. for ¾ hours. Drying was then conducted at 50 to 70° C. at 200 mm. for 6 hours. The product was then stripped of combined alcohol at 70 to 80° C. at less than 1 mm. for 8 hours. The yield was 90.4 grams and analysis showed 12.5% aluminum, 23.7% ash, 0.13% alcohol, and 9.6% free sorbitol. Approximate molar ratio of aluminum to sorbitol to inorganic hydroxyl groups was 1:1:1.

Example IV

Using the same procedure used in Example I, the flask was charged with 72.9 grams of sorbitol and 10.2 grams of water. The mixture was vigorously stirred and heated. 81.6 grams of finely-ground aluminum isopropoxide was then added at 65 to 75° C. during 22 minutes. As a diluent 140 ml. isopropyl alcohol was added. The reaction was then continued at 70° C. for 2 hours. The product was dried at 50 to 70° C. at 200 mm. for 2 hours and 70 to 80° C. at 20 mm. for 4 hours. The product was stripped of combined alcohol at 70 to 80° C. at less than 1 mm. for 16 hours. The yield was 88.0 grams. Analysis showed 12.7% aluminum, 24.0% ash, 0.2% alcohol, 6.8% free sorbitol. The approximate molar ratio of aluminum to sorbitol to inorganic hyroxyl groups was 1:1:0.64.

Example V

A flask was charged with 72.9 grams sorbitol and 86.2 grams water and the mixture was vigorously stirred and heated. 244.8 grams of finely-ground aluminum isopropoxide was then added in portions at a temperature of 54 to 71° C. over a 46-minute period. The mixture became thicker and 250 ml. isopropyl alcohol was added in stages as the reaction proceeded over a 3-hour period. Drying was then carried out at 50 to 70° C. at 200 mm. for 3 hours and 70 to 80° C. at 20 mm. for 5 hours. The product was stripped of combined alcohol at 70 to 80° C. at less than 1 mm. for 38 hours. The yield was 135.7 grams. Analysis showed 22.9% aluminum, 43.2% ash, 0.33% alcohol, and 0.25% free sorbitol. The approximate molar ratio of aluminum to sorbitol to inorganic hydroxygroups was 3:1:4.5.

Example VI

Using the procedure used in Example I, a flask was charged with 72.9 grams sorbitol and 177.2 grams of water. The mixture was vigorously stirred and heated. Then 244.8 grams finely-ground aluminum isopropoxide was added in portions at 60 to 65° C. over a 34-minute period. A diluent of 230 ml. of isopropyl alcohol was then slowly added over a 4-hour period as the reaction was permitted to complete. Drying was then carried out at 50 to 70° C. at 200 mm. for 20 hours. The product was stripped of combined alcohol at 70 to 80° C. at less than 1 mm. for 16 hours. The yield was 139.4 grams. Analysis showed 23.1% aluminum, 43.7% ash, 0.095% alcohol, and 1.52% free sorbitol. The approximate molar ratio of aluminum to sorbitol to inorganic hydroxyl groups was 3:1:5.

Example VII

Erythritol, 122 grams, is mixed with 220 ml. water and heated at 70° C. until dissolved. Aluminum ethoxide, 324.4 g., is added in portions while the temperature is held near 70° C. Ethanol, 500 ml., is added when the reaction mixture becomes so thick that stirring becomes difficult. The reaction mixture is heated at 70° C. for about an hour and excess solvent is then removed at that temperature while applying vacuum. Vacuum is gradually increased to below 1 mm. while the solid product is held at about 70 to 85° C. under agitation. Stripping is completed at 70–85° C. and below 1 mm. for about 24 hours. The product is a white solid containing 2 gram atoms aluminum per mole of erythritol.

Example VIII

Diglycerol, 166.2 grams, is diluted with 40 ml. water and the solution heated at 70° C. Aluminum ethoxide, 162.2 grams, is added in portions while the temperature is kept near 70° C. Ethanol, 150 ml., is added to the reaction mixture when stirring becomes difficult. The reaction temperature is maintained for 15 minutes and then excess alcohol is removed by distillation under slight vacuum. Vacuum is gradually increased to below 1 mm. and stripping of the solid product is carried out at 70–85° C. below 1 mm. for 24 hours. The product is a white solid containing 1 gram atom aluminum per mole of diglycerol.

What is claimed is:

1. A process for producing an aluminum complex of a polyhydroxy compound comprising
   (A) Reacting aluminum alkoxide with a polyhydroxy compound in the presence of an amount of water, in moles per gram atom of aluminum, equal to about 6 to about 18 times the number of gram atoms of aluminum charged divided by the number of hydroxyl equivalents of polyhydroxy compound charged;
   (B) Drying the product formed in Step (A); and
   (C) Vacuum treating the product formed in Step (B) at about 55 to about 90° C. and at less than about 1 mm. Hg.

2. The process of claim 1 wherein the amount of water, in moles per gram atom of aluminum, is equal to about 12 times the number of gram atoms of aluminum charged divided by the number of hydroxyl equivalents of polyhydroxy compound charged.

3. The process of claim 1 wherein said polyhydroxy compound is sorbitol.

4. The process of claim 1 wherein said aluminum alkoxide is aluminum isopropoxide.

5. The process of claim 1 wherein the amount of water, in moles per gram atom of aluminum, is equal to about 6 to about 12 times the number of gram atoms of aluminum charged divided by the number of hydroxyl equivalents of polyhydroxy compound charged when the ratio of gram atoms of aluminum to each hydroxyl group of the polyhydroxy compound is about 0.1 to about 0.4, and the amount of water, in moles per gram atom of aluminum, is equal to about 12 to about 18 times the number of gram atoms of aluminum charged divided by the number of hydroxyl equivalents of polyhydroxy compound charged when the ratio of gram atoms of aluminum to each hydroxyl group of the polyhydroxy compound is about 0.4 to about 0.7.

6. The process of claim 1 wherein said complex has a ratio of gram atoms of aluminum to each hydroxyl group of the polyhydroxy compound of about 0.1 to about 0.7.

7. The process of claim 1 wherein said aluminum alkoxide has the formula $Al(OR)_3$ and said polyhydroxy compound has 3 to 6 carbon atoms and 2 to 6 hydroxy groups, where R is alkyl to $C_4$.

8. The process of claim 1 wherein a water-miscible solvent is present during the reaction.

9. The process of claim 8 wherein said water-miscible solvent is an alcohol.

References Cited

UNITED STATES PATENTS

| | | |
|---|---|---|
| 3,198,332 | 8/1965 | Davison _____ 260—448 AD X |
| 3,352,895 | 11/1967 | Holbert et al. ____ 260—448 AD |
| 3,507,896 | 4/1970 | Jones et al. _____ 260—448 AD |
| 3,511,864 | 5/1970 | Ugelow et al. ____ 260—448 AD |
| 3,520,911 | 7/1970 | Jones et al. _____ 260—448 AD |
| 3,523,129 | 8/1970 | Holbert et al. ____ 260—448 AD |
| 3,523,130 | 8/1970 | Jones et al. _____ 260—448 AD |
| 3,523,153 | 8/1970 | Holbert et al. __ 260—448 AD X |

FOREIGN PATENTS

| | | |
|---|---|---|
| 911,632 | 11/1962 | Great Britain ____ 260—448 AD |
| 961,299 | 6/1964 | Great Britain ____ 260—448 AD |

TOBIAS E. LEVOW, Primary Examiner

H. M. S. SNEED, Assistant Examiner